United States Patent [19]

Kroh et al.

[11] Patent Number: 4,773,454

[45] Date of Patent: Sep. 27, 1988

[54] TIRE INFLATING DEVICE, PARTICULARLY FOR INFLATING A BICYCLE TIRE

[75] Inventors: Wilfried Kroh, Taunusblick 8, D-6387 Karben 4; Reinhard Kurz, Nidderau, both of Fed. Rep. of Germany

[73] Assignee: Wilfried Kroh, Karben, Fed. Rep. of Germany

[21] Appl. No.: 32,328

[22] Filed: Mar. 30, 1987

[30] Foreign Application Priority Data

Apr. 9, 1986 [DE] Fed. Rep. of Germany ... 8609642[U]

[51] Int. Cl.$^4$ ............................................. B65B 31/08
[52] U.S. Cl. ...................................... 141/330; 141/4; 152/415
[58] Field of Search ................................ 152/415–419, 152/424–426; 141/7, 19, 21, 38, 66, 84, 113, 4, 330

[56] References Cited

U.S. PATENT DOCUMENTS

| | | | |
|---|---|---|---|
| 2,533,685 | 12/1950 | Nurkiewicz | 141/19 |
| 2,876,846 | 3/1959 | Howard | 141/19 |
| 3,632,045 | 1/1972 | Oana | 141/19 |
| 3,834,433 | 9/1974 | Thompson | 152/415 |
| 3,865,158 | 2/1975 | Withrow | 141/19 |
| 4,658,869 | 4/1987 | Soon-Fu | 141/38 |

FOREIGN PATENT DOCUMENTS

| | | | |
|---|---|---|---|
| 3205264 | 8/1983 | Fed. Rep. of Germany | 141/38 |
| 425636 | 6/1911 | France | 141/38 |

*Primary Examiner*—Richard V. Fisher
*Assistant Examiner*—Richard D. Jordan
*Attorney, Agent, or Firm*—Herbert Dubno

[57] ABSTRACT

The tire filling unit, particularly for filling a bicycle tire, comprises a filling head with an outlet connectable to a filling valve of a tire and with an inlet containing a hollow prong for a high pressure gas cartridge and a concentric cartridge jacket attachable with the filling head at the inlet for receiving the high pressure cartridge. A connecting duct contains an automatically closing valve between the inlet and the outlet which locks the connecting duct in a closed configuration and which is movable into an open configuration by an operating device mounted in the filling head.

3 Claims, 1 Drawing Sheet

TIRE INFLATING DEVICE, PARTICULARLY FOR INFLATING A BICYCLE TIRE

FIELD OF THE INVENTION

The present invention relates to a tire inflating device and, more particularly, to a device for inflating a bicycle tire with air.

BACKGROUND OF THE INVENTION

A tire inflating device, particularly for inflating a bicycle tire, is known comprising an inflating head with an outlet connectable to an inflating valve of a tire and with an inlet opening for a high pressure gas cartridge containing a hollow cartridge-piercing pin and a cartridge jacket for receiving the high pressure gas cartridge connectable with the inflating head concentric to the inlet.

This tire inflating device can be used in place of a standard hand air pump and has the advantage that it is simple, requires little space and allows a rapid and effortless inflation of a bicycle tire to an appropriate high pressure. This tire inflating device is of particular advantage for cycle racers.

In a known tire inflating device described in German Open Patent Application No. DE-OS 32 05 264 the inflating head with its outlet opening is connected to the tire valve for inflation of the tire and subsequently the hollow cartridge-piercing pin is inserted in the high pressure gas cartridge by screwing on the cartridge jacket. As a result the total amount of the gases in the high pressure gas cartridge flows suddenly into the tire. The measured amount of gas required to reach the desired final pressure determines the size and type of the high pressure gas cartridge. This has the disadvantage that high pressure gas cartridges of different sizes must be made and stored for different tire dimensions. A subsequent further pressurization of the tire is not possible, nor is the use of the unit only for adding a small amount of air to the tire.

OBJECTS OF THE INVENTION

It is an object of the invention to provide an improved tire inflating device, particularly for inflating a bicycle tire, which will obviate the drawbacks enumerated above.

It is also an object of this invention to provide an improved tire inflating device which can be used for inflating a variety of different tires.

It is another object of the invention to provide an improved tire inflating device which provides for subsequent inflation of a tire in which the pressure is low.

SUMMARY OF THE INVENTION

These objects and others which will become more readily apparent hereinafter are attained in accordance with the invention in a tire inflating device, particularly for inflating a bicycle tire, comprising an inflating head with an outlet connectable to an inflating valve of a tire and with an inlet for a high pressure gas cartridge containing a hollow cartridge-piercing pin, the inflating head being provided with a connecting duct connecting the inlet and the outlet, and a cartridge jacket for receiving the high pressure gas cartridge attachable with the inflating head concentric to the inlet.

According to the invention the connecting duct contains an automatically closing valve between the inlet and the outlet which locks the connecting duct in its closed configuration and which is movable into its open configuration by an operating device mounted on the inflating head. The tire inflating device according to the invention has the advantage that the gas volume supplied by the high pressure gas cartridge can be provided in measured amounts with the help of the valve so that tires of different size can be satisfactorily inflated to a maximum pressure irrespective of whether the tire is empty or partially full. Further also a higher pressure may be attained with the tire inflating device since an already inflated tire can be further pressurized with a newly inserted high pressure gas cartridge having a higher interior pressure.

According to a further feature of the invention the automatically closing valve is a tire valve attachable in the connecting duct from the exterior which is operable from the outside by a plunger closing the opening in which the valve is mounted. Tire valves have been proven in practice and are made economically in large numbers. The tire inflating device according the invention makes use of these advantages. Further according to the invention the tire valve is easily taken out after removal of the plunger with a deformation and cleaned and/or replaced.

The inflating head can comprise a cylindrical housing with a central stepped main passage whose middle portion has a sealing cone and an interior thread for receiving the tire valve whose one end is widened for receiving the hollow cartridge-piercing pin and the neck of the high pressure gas cartridge and whose other end receives the plunger for operation of the tire valve. The inflating head can be made with minimal expense and allows a uniform shape for the device comprising the inflating head and the cartridge jacket.

A reliable seal between the high pressure gas cartridge and the inflating head can be attained according to a further feature of the invention in which the widened end of the main passage receiving the hollow cartridge-piercing pin contains a sealing ring in a circular groove in which the neck engages the high pressure gas cartridge before insertion of the hollow cartridge-piercing pin.

In another feature of the invention a transverse passage branches off from the main passage between the tire valve and the plunger to connect the main passage with the outlet. This transverse passage has a threaded outlet connector at the outlet at its exterior end.

The plunger can be operated by an operating lever which is mounted on the front end of the inflating head and a lever arm extending along the cylindrical surface of the inflating head on the end of the inflating head opposite the threaded end. This arrangement allows a simple manual handling of the tire inflating device according to the invention. The lever arm can also serve as a hook for hanging the tire inflating device at a storage location.

Also according to the invention the cartridge jacket can have a vent hole through which its interior is connected to the atmosphere. This guarantees that the high pressure gas can escape through the vent hole to the atmosphere for complete emptying of the high pressure gas cartridge by unscrewing the cartridge jacket before the inflating head and the cartridge jacket are completely separated from each other. No high pressure cushion can be formed in the cartridge jacket which can be forced out from the cartridge jacket on breaking the connection between the inflating head and the cartridge jacket as might occur explosively. To further improve the safety of the device the cartridge jacket can be provided with a retaining member by which the high pressure gas cartridge is locked in the cartridge jacket. With the help of this retaining member on removal of the cartridge jacket the high pressure gas cartridge is reliably separated from the main passage of the inflating head so that any residual pressure present is eliminated by discharge through the vent hole.

In another feature of the invention the cartridge jacket is connectably pressurized with the inflating head. A supply connector thread, in which the vent hole opens, is formed in the jacket base of the cartridge jacket for a connector for additional high pressure tanks. A high pressure air container of larger size can be connected to the tire inflating device by the vent hole of the cartridge jacket so that it may be filled at a tank inflating station and can be used in home applications. The high pressure gas container or tank can be provided with a suitable cartridge inflating valve which is pushed open by the supply connector thread. It is also possible to fill the high pressure gas tank through the tire inflating valve of the device when the high pressure source is connected to the outlet of the tire inflating device an simultaneously the valve of the tire inflating device is operated.

BRIEF DESCRIPTION OF THE DRAWING

The above and other objects, features and advantages of the invention will become more readily apparent from the following description, reference being made to the accompanying highly diagrammatic drawing in which.

SPECIFIC DESCRIPTION

Figure 1:
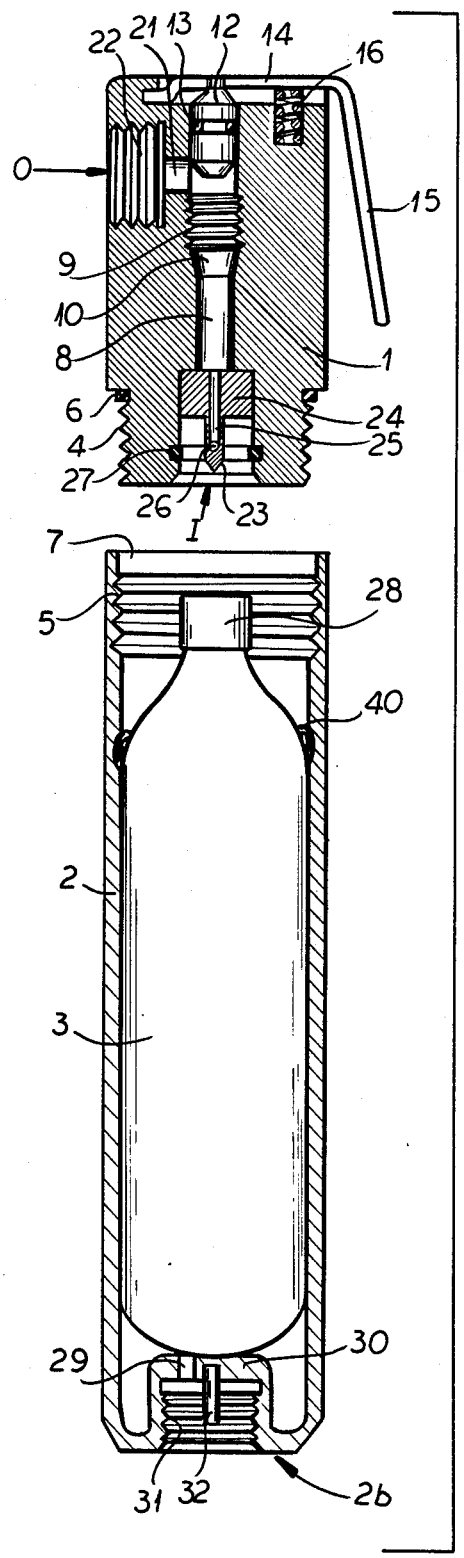
FIG. 1 is a longitudinal cross sectional view through an open tire inflating device according to the invention, the valve of which has not been shown.

The tire inflating device shown in the drawing comprises a basically cylindrical inflating head 1 and a cylindrical cartridge jacket 2 in which a flask-like high pressure cartridge 3 is found.

The inflating head 1 and the cartridge jacket 2 have approximately equal outer diameters. The one end of the inflating head 1 is provided with an outer thread 4 and is of a smaller diameter than the rest of the inflating head. The open end of the cartridge jacket 2 is provided with an inner thread 5 and is screwed on this outer thread 4.

A sealing ring 6, which cooperates with the sealing surfaces 7 on the open end of the cartridge jacket 2 on completely screwing together the cartridge jacket 2 against the inflating head 1, forms a presure-retaining seal for the outer thread 4 of the outer surface of the inflating head 1.

Figure 2:
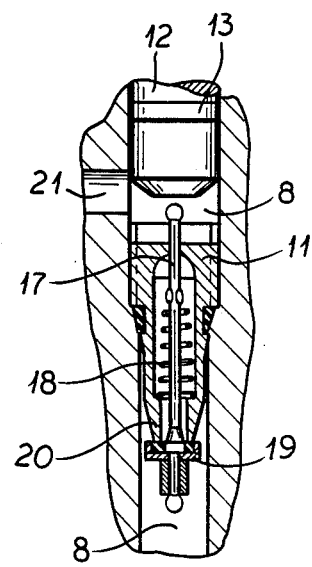
FIG. 2 is a magnified cross sectional view of a tire valve mountable in the inflating head of the tire inflating device according to FIG. 1.

The inflating head 1 is provided with a central main passage 8 which has an interior thread 9 in its middle region and a conical sealing surface 10. The interior thread 9 and the sealing surface 10 receive a tire valve 11 as shown in FIG. 2 which is screwed in from the top of the device in the main passage 8.

The main passage 8 is closed by a slidable plunger 12 with a sealing ring 13 above the tire inflating valve 11 which seals the main passage 8. The plunger 12 is engaged with an operating lever 14 mounted on the front end of the inflating head 1. The operating lever 14 has a bent lever arm 15 which extends approximately parallel to the longitudinal axis of the inflating head 1. The operating lever 14 is movable against a compressible spring 16 by which it is retained in its resting position.

On operation of the operating lever 14, the plunger 12 is pushed in far enough so that it slides the valve needle 17 of the tire valve 11 against the force of the valve spring 18. As a result, the valve disk 19 is lifted from the valve seat 20, i.e. opens the tire valve 11. The sealing rings can be O-rings.

A transverse passage 21, which leads to a threaded outlet connector 22 in which a connector pipe of a hose connector can be screwed, branches from the main passage 8 between the tire valve 11 and the plunger 12. This transverse passage 21 is used to connect the tire inflating device to the valve of a tire.

The end of the passage 8 facing the cartridge jacket 2 is widened into a step shaped recess and contains a hollow cartridge-piercing pin 23 with a cylindrical foot 24 which is braced against the supporting surfaces of the inflating head 1. The hollow cartridge-piercing pin 23 has a central passage 25 leading to its tip from the vicinity of foot 24 which opens into transverse hole 26. A sealing ring 27 is located in a circular groove in the main passage 8 near the tip of the hollow cartridge-piercing pin 23.

The sealing ring 27 encircles the neck 28 of the high pressure gas cartridge 3 sealing tightly when the inflating head 1 and the cartridge jacket 2 are screwed in before the hollow cartridge-piercing pin 23 has been pushed in the high pressure gas cartridge 3.

The end of the cartridge jacket 2 on the opposite end from the inflating head 1 has a vent hole 29 which connects the interior of the cartridge jacket 2 with the atmosphere. The vent hole 29 is located in a recess 30 in the jacket base 2b which is provided with a supply connector thread 31 and a push rod 32.

The connector pipe of a pressurized air tank or container can be screwed into this recess sealing tightly.

The push rod 32 holds open the inflating valve of the pressurized air tank. The tire inflating device can thus be charged by a pressurized air tank at an inflating station whose volume amounts to a multiple of that of the illustrated pressurized gas cartridge 3 and which allows an economical steady use of the tire inflating device.

The drawing shows the tire inflating device in which the high pressure gas cartridge 3 can be inserted or exchanged in its open state. The cartridge jacket 2 is screwed on the outer threads 4 of the inflating head 1 with its inner threads 5 during use.

Thus the neck 28 is pushed in the widened recess of the passage 8 and it slides over the sealing ring 27. The hollow cartridge-piercing pin 23 is forced in the front end of the high pressure gas cartridge 3 and pushes it in so far that the transverse passage 26 is found on the inside of the high pressure case cartridge 3 in its final inserted position. The high pressure gas cartridge 3 is now sealed to the inlet I of the main passage 8.

The inflating head 1 is connected by the threaded outlet connector 22 as given above with the tire valve for inflating a tire.

The tire valve 11 is opened by operation of the operating lever 14 whereby the gas from the high pressure gas cartridge 3 reaches by the transverse hole 26, the central passage 25, the tire valve 11, the transverse passage 21 and the unshown tire valve of the tire.

The operating lever 14 is held depressed until the desired pressure in the tire is reached. Since the pressure in the middle portion of the passage 8 and in the transverse passage 21 which corresponds to the tire inflating pressure acts on the plunger 12, the operating force on the operating lever 14 increases with increasing inflating pressure so that the pressure in the tire increases satisfactorily according to this and a measured inflating results.

When the high pressure gas cartridge 3 is emptied after one or more inflating processes, the inflating head 1 and the cartridge jacket 2 are again unscrewed and the empty high pressure gas cartridge is replaced by a fresh one.

To guarantee the high pressure gas cartridge 3 can be pulled from the passage 8 and in this way to guarantee that the high pressure gas cartridge 3 is completely empty before the separation of the inflating head 1 and the cartridge jacket 2, an easily removable retaining device 40, (e.g. a spring sleeve) is located in the cartridge jacket 2 and fixes the high pressure cartridge 3 axially against being pulled out with the head. Alternatively, a compressible spring can be provided instead of a retaining device and can be braced between the high pressure gas cartridge 3 and the inflating head 1.

The connection duct between the outlet O and the inlet I of the tire inflating device comprises by definition the transverse passage 21 and the portion of the main passage 8 connecting the transverse passage 21 with the inlet I of the main passage 8.

What is claimed is:

1. A tire inflating device, particularly for inflating a bicycle tire, comprising:
   an inflating head with an outlet connectable to an inflating valve of a tire and with an inlet containing a hollow cartridge-piercing pin having a cylindrical housing with a central stepped main passage which has a middle portion having a sealing cone and an interior thread;
   a high pressure gas cartridge having a neck engagable with said hollow cartridge-piercing pin, one end of said main passage being widened for receiving said hollow cartridge-piercing pin and said neck of said high pressure gas cartridge and containing a sealing ring inserted in a circular groove on which said neck of said high pressure gas cartridge engages before insertion of said hollow cartridge-piercing pin;
   a cartridge jacket which receives said high pressure cartridge attachable with said inflating head at said inlet;
   a connecting duct containing an automatically closing valve entirely between said inlet and said outlet operable from the outside by a plunger which locks said connecting duct in a closed configuration and which is movable into an open configuration by an operating device mounted in said inflating head, the other end of said main passage receiving said plunger;
   a transverse passage branching from said main passage between said automatically closing valve and said plunger which has at an outer end an outer connector thread at said outlet; and
   an operating lever for operating said plunger operable by an operating lever which is mounted on the front end of said inflating head and a connected lever arm extending along said cylindrical outer surface of said inflating head on the end of said inflating head opposite said theads for said cartridge jacket, said cartridge jacket being provided with a vent hole by which the interior of said cartridge jacket is connected to the atmosphere.

2. The device according to claim 1 wherein said cartridge jacket has a retaining member by which said high pressure gas cartridge is held in said cartridge jacket.

3. The device according to claim 1 wherein a supply connector thread for a connector for an additional high pressure tank is formed on a jacket base of said cartridge jacket, and said vent hole is located in said base.

* * * * *